I. P. CADMAN,
Assignor, by mesne assignments, of two-thirds to WILSON R. SMITH and GEO. GRAY.
Draft Equalizer.
No. 9,758. Reissued June 14, 1881.
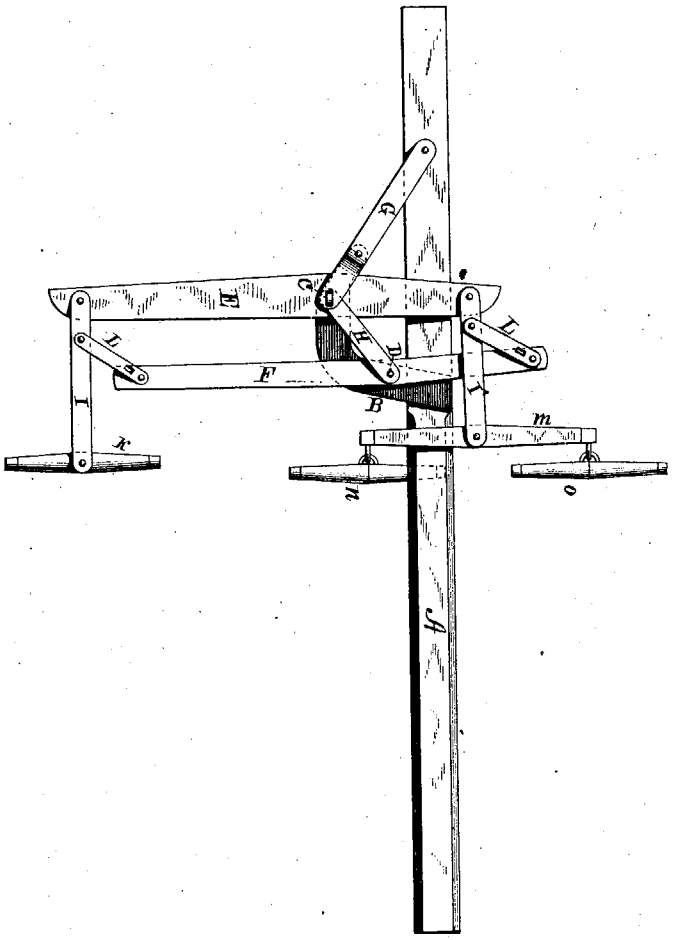
Witnesses.
E. R. Smith
C. O. Tattershall
Inventor.
Isaac P. Cadman
N. PETERS. Photo-Lithographer, Washington, D. C.

UNITED STATES PATENT OFFICE.

ISAAC P. CADMAN, OF BELOIT, WISCONSIN, ASSIGNOR, BY MESNE ASSIGNMENTS, OF TWO-THIRDS TO WILSON R. SMITH AND GEORGE GRAY, OF SAME PLACE.

DRAFT-EQUALIZER.

SPECIFICATION forming part of Reissued Letters Patent No. 9,758, dated June 14, 1881.

Original No. 217,267, dated July 8, 1879. Application for reissue filed March 21, 1881.

*To all whom it may concern:*

Be it known that I, ISAAC P. CADMAN, a citizen of the United States, residing at the city of Beloit, in the county of Rock and State of Wisconsin, have invented a new and useful Improvement in Draft-Equalizers, of which the following is a specification.

My invention relates to improvements in draft-equalizers most usually designated as "three-horse draft-equalizers," but is not wholly restricted to that class of machines, as will hereinafter be mentioned; and the object of my invention, contained in the mechanism hereinafter particularly described, is to produce an improved draft-equalizing device which shall accomplish a much-needed improvement in the mechanism in question. My aim is also to simplify the construction and arrangement as well as materially reduce the cost of manufacturing such machines containing my invention therein. I attain these objects by means of the mechanism illustrated in the accompanying drawing, and which drawing is a general plan view of my improved equalizing device, which is intended for the purpose of overcoming the side draft upon any vehicle or other machine or thing having side draft resulting from the employment of three horses abreast, and drawing the vehicle or other thing by means of an ordinary draft-pole or tongue, and is also available on any machine or thing which has side draft resulting from its peculiar construction and the particular kind of work it has to do, whether two or three horses or other draft-animals are required to furnish the necessary motive power.

Similar letters refer to similar parts throughout the said view in the drawing, and in which the mechanism illustrated and containing my invention is described as follows:

The offset draft-iron B is rigidly bolted to the tongue A, and the back end of which is also rigidly bolted or riveted to the fore end of the hammer-strap G, the rear end of which is also rigidly bolted to the tongue A.

The equalizer E is pivoted to and vibrates between the upper side of the offset iron B and overlapping lip of the hammer-strap G, and the equalization of draft is all produced on and by means of the equalizer E, with co-operative mechanism, one end of which being double the length of the other from the pivotal point thereof at C.

To the ends of the equalizer E are pivoted draft-straps I and I′, which extend forward, and are also at their forward ends severally pivoted to the double-tree M and the odd single-tree K, as shown.

To the draft-straps I and I′ are pivoted link-straps L, which are also pivoted to the auxiliary bar F, which is also pivoted to the offset iron B at D. The letter H shows a brace-strap extending from the pivotal point C to the pivotal point D, for the purpose of serving as a brace to the auxiliary bar F.

It will be seen that the straps I and I′ are held out of line with the tongue A by means of the link-straps L, as shown, and the draft on the double-tree M and the odd single-tree K being in line with the tongue, an obtuse angle is produced in the line of draft at the forward ends of the draft-straps I and I′, by means of which obtuse angle a side leverage is exerted or produced upon the draft-straps I and I′, which is communicated to the auxiliary bar F by means of the link-straps L, and which side leverage is also transmitted through the auxiliary bar F to the offset iron B, thereby holding the tongue in direct line of draft, and prevents it from swinging or vibrating to one side by means of the side draft, which said equalization of and direct draft is caused by the center of draft being transferred or offset from the center of the tongue to the pivotal point at C.

The usual single-trees are denoted by letters O, N, and K.

It will be understood that by the employment of this device the work to be performed will be equally distributed between three horses working abreast, and that this equalizer is particularly adapted for use in heavy plowing and on harvesters, the team being conveniently handled and turned in short space at the end of the field, which it is believed could not be done to advantage by the ordinary three or four horse team, which would involve much inconvenience, loss in time, and cause extra work.

I am aware that prior to my invention equalizing devices in various forms have been made. I therefore do not claim the construction of such a device, broadly; but What I do claim as my invention, and desire to secure by Letters Patent, is—

1. In a draft-equalizing device, the offset-iron B, provided with two pivotal points, C and D, the auxiliary bar F, and draft-straps I and I′, provided with link-straps L, substantially as described and shown.

2. The combination, in a draft-equalizing machine or device, with the tongue or pole A, of the offset iron B, equalizer E, hammer-strap G, brace H, auxiliary bar F, link-straps L, draft-straps I and I′, double-tree M, and single-trees O, N, and K, when the whole is constructed and arranged substantially as described and shown.

ISAAC P. CADMAN.

Witnesses:
E. R. SMITH,
C. O. TATTERSHALL.